United States Patent [19]

Satuka et al.

[11] Patent Number: 4,939,832
[45] Date of Patent: Jul. 10, 1990

[54] APPARATUS FOR ASSEMBLING A SEAT FOR USE IN AN AUTOMOBILE

[75] Inventors: Yoshihiko Satuka; Teturo Kusuhara, both of Hiroshima, Japan

[73] Assignee: Delta Kogyo Co., Ltd., Hiroshima, Japan

[21] Appl. No.: 340,673

[22] Filed: Apr. 20, 1989

[30] Foreign Application Priority Data

Apr. 20, 1988 [JP] Japan .............................. 63-54092[U]

[51] Int. Cl.⁵ .............................................. B23Q 1/04
[52] U.S. Cl. .................................. 29/281.4; 29/281.5
[58] Field of Search ................. 29/281.1, 281.4, 281.5; 269/71, 74, 69-70, 56, 57, 37, 40

[56] References Cited

U.S. PATENT DOCUMENTS

| 4,183,511 | 1/1980 | Marek | 269/71 |
| 4,531,720 | 7/1985 | Soder | 269/71 |
| 4,729,552 | 3/1988 | Pempek | 269/71 |
| 4,819,922 | 4/1989 | Boike | 269/71 |

Primary Examiner—Robert C. Watson
Attorney, Agent, or Firm—Wenderoth, Lind & Ponack

[57] ABSTRACT

The disclosure relates to an apparatus for assembling a seat for use in an automobile. The apparatus comprises a horizontally rotatable rotary table mounted on a base; a first supporting arm whose front end portion is longitudinally pivotally mounted on the rotary table by a first hinge axis; a second supporting arm whose rear end portion is longitudinally pivotally mounted on the rear end portion of the first supporting arm by a second hinge axis; a setting hose which is mounted on the front end portion of the second supporting arm and on which the lower corner of the seat back frame is placed in a position in which the seat back frame is approximately perpendicular to the rotary table; a rotation locking mechanism for locking the rotary table at a predetermined rotational position thereof; a first stopper which contacts with the first supporting arm so as to lock the first supporting arm in a forward position in which the first supporting arm forms an angle of approximately 45° with the rotary table; and a second stopper which contacts with the second supporting arm so as to lock the second supporting arm in a backward position in which the second supporting arm makes an angle of approximately 90° with the rotary table.

4 Claims, 8 Drawing Sheets

APPARATUS FOR ASSEMBLING A SEAT FOR USE IN AN AUTOMOBILE

BACKGROUND OF THE INVENTION

1. Field of the Invention

The present invention relates to an apparatus for assembling a seat for use in an automobile.

2. Description of the Prior Art

Heretofore, the assembly line for an automobile seat, included a seat cushion assembling apparatus and a seat back assembling apparatus placed alternately on a conveyor belt. In this seat assembly line, using the seat cushion assembling apparatus, a seat cushion pad is placed on a seat cushion frame, then the seat cushion frame is covered with a seat cushion trim. Thus, a seat cushion is manufactured. A seat back is manufactured by using the seat back assembling apparatus. That is, a seat back pad is placed on a seat back frame, then the seat back frame is covered with a seat back trim. Thereafter, using a seat assembling apparatus, the seat cushion is mounted on a seat slider and the seat back is mounted on the seat cushion. Thus, the seat is manufactured.

In the above-described process for manufacturing the seat, the seat back assembling apparatus carries the seat back frame and the seat back thereon, but is incapable of stabilizing the seat back frame. Therefore, it requires a considerable amount of skill to properly cover the seat back frame with the seat back trim, wind the end portion of the seat back trim around the seat back frame, and fasten the end portion of the seat back trim to the seat back frame.

Further, hard labor is required for a worker to cover the seat back frame with the seat back trim, wind the end portion of the seat back trim around the seat back frame, and fasten the end portion of the seat back trim to the seat back frame while the worker is manually rotating the heavy seat back frame or is walking around the seat back frame.

SUMMARY OF THE INVENTION

It is therefore the essential object of the present invention to provide an apparatus for assembling a seat, for use in an automobile, which can overcome the disadvantage described above and facilitates the manufacturing of a seat back.

In accomplishing the above-described object, the apparatus for assembling a seat for use in an automobile in accordance with the present invention comprises a rotary table which is mounted on a base and is horizontally rotatable; a first supporting arm whose front end portion is longitudinally pivotally mounted on the rotary table by a first hinge axis; a second supporting arm whose rear end portion is longitudinally pivotally mounted on the rear end portion of the first supporting arm by a second hinge axis; a setting base which is mounted on the front end portion of the second supporting arm and on which the lower corner of the seat back frame is placed in a position in which the seat back frame is approximately perpendicular to the rotary table; a rotation locking mechanism for locking the rotary table at a predetermined rotational position thereof; a first stopper which contacts with the first supporting arm so as to lock the first supporting arm in a forward position in which the first supporting arm forms an angle of approximately 45° with the rotary table; and a second stopper which contacts with the second supporting arm so as to lock the second supporting arm in a backward position in which the second supporting arm makes an angle of approximately 90° with the rotary table.

In accordance with the present invention, since the seat back frame is placed in position in the setting base of the second supporting arm disposed above the rotary table so that the seat back frame is substantially perpendicular to the rotary table, the seat back frame is stabilized in the setting base. Accordingly, even those not skilled in the art can easily cover the seat back frame with the seat back trim, wind the end portion of the seat back trim around seat back frame, and fasten the end portion of the seat back trim to the seat back frame.

Further, the setting base of the second supporting arm can be horizontally rotated by manually rotating the rotary table without applying a great amount of force and the rotary table can be lock at a predetermined position by rotation locking mechanism. Thus, a worker while, standing in the same position alongside the conveyor belt can easily cover the seat back frame with the seat back trim, wind the end portion of the seat back trim around seat back frame, and fasten the end portion of the seat back trim to the seat back frame.

Furthermore, since the first stopper is brought in contact with the first supporting arm so as to lock the first supporting arm in the forward position in which the first supporting arm forms an angle of approximately 45° with the rotary table, the seat back frame can be tilted approximately 45° with respect to the rotary table. Further, since the second stopper is brought in contact with the second supporting arm so as to lock the second supporting arm in the backward position in which the second supporting arm forms an angle of approximately 90° with the rotary table, the seat back frame can be tilted approximately 90° with respect to the rotary table, whereby the seat back frame can be easily covered with the seat back trim, the end portion of the seat back trim can be easily wound around the seat back frame, and the end portion of the seat back trim can be easily fastened to the seat back frame.

In addition, while standing in the same position alongside the conveyor belt and with the conveyor belt at the height of the worker's waist, the worker can easily accomplish seat manufacturing operations.

BRIEF DESCRIPTION OF THE DRAWINGS

These and other objects and features of the present invention will become clear from the following description of the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
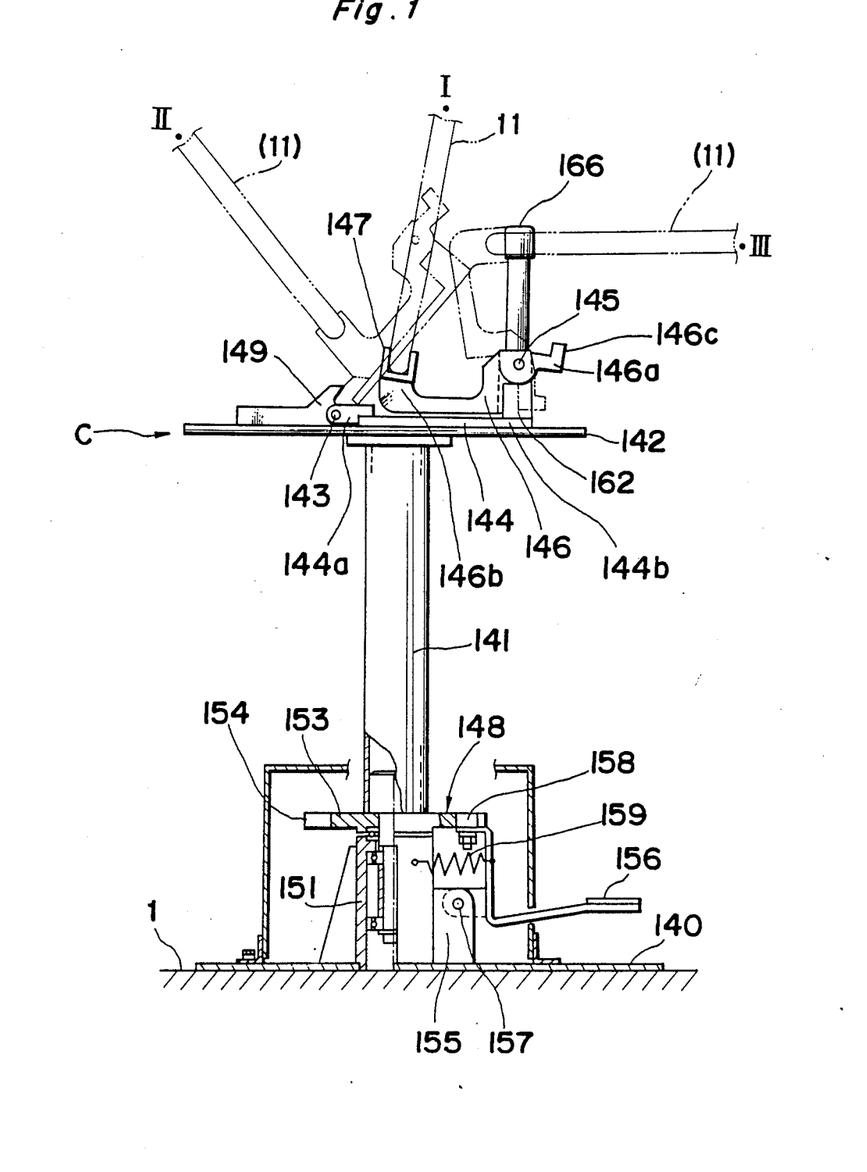
FIG. 1 is a side elevational view of an apparatus for assembling a seat for use in an automobile in accordance with the present invention.

Referring to FIG. 1, there is shown a seat back assembling apparatus (C) which is placed on a conveyor belt (not shown) in a process for manufacturing a seat for use in an automobile. According to this seat manufacturing process, a worker can assemble the seat back at waist height of the worker standing on a floor 1. The worker can perform seat assembling operations standing alongside the seat back assembling apparatus (C).

In the assembly line for the automobile seat a conveyor belt (not shown) is arranged as high as the waist of the worker who is standing on the floor 1, and seat cushion assembling apparatus and seat assembling apparatus are alternately arranged on the conveyor belt moving at a low speed. Thus, the worker performs his allotted task while standing alongside the belt conveyor.

Figure 11A:
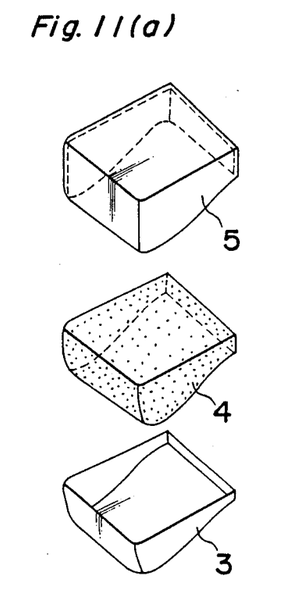
FIG. 11(a) is an exploded perspective view showing the seat cushion.
Figure 11B:
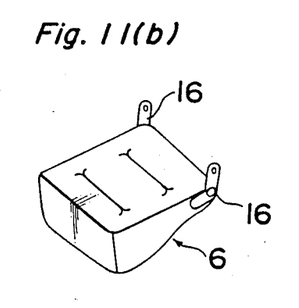
FIG. 11(b) is a perspective view showing a seat cushion.

A seat cushion 6 is manufactured by using the seat cushion assembling apparatus as follows: As shown in FIG. 11(a), a seat cushion pad 4 is applied to a seat cushion frame 3, then the seat cushion pad 4 is covered with the seat cushion trim 5, and then the end portion of the seat cushion trim 5 is wound around the seat cushion frame 3. Then, the end portion of the seat cushion trim 5 is fastened to the seat cushion frame 3. Thereafter, as shown in FIG. 11(b), reclining brackets 16 are mounted on the seat cushion frame 3.

Figure 10A:
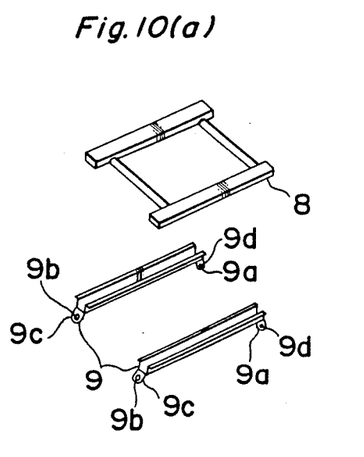
FIG. 10(a) is an exploded perspective view showing a seat slider.
Figure 10B:
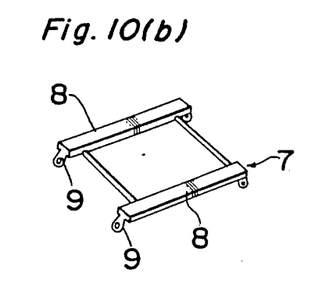
FIG. 10(b) is a perspective view showing a seat slider.

A seat slider 7 as shown in FIG. 10(b) is manufactured by engaging a lower rail 9 and an upper rail 8 with each other in a process separate from the process for manufacturing the seat cushion 6.

Figure 12A:
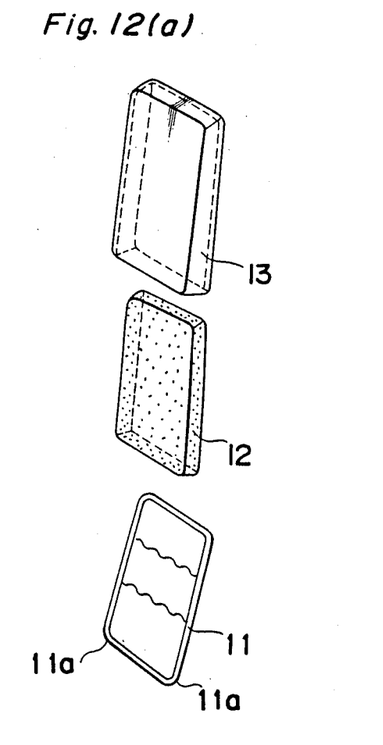
FIG. 12(a) is an exploded perspective view showing a seat back.
Figure 12B:
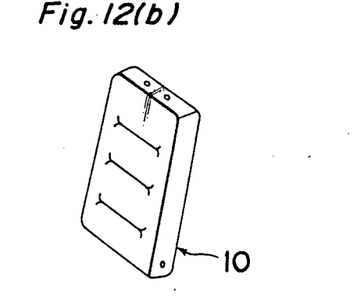
FIG. 12(b) is a perspective view showing the seat back.

Referring to FIG. 12(a), a seat back 10 as shown in FIG. 12(b) is manufactured by using the seat back assembling apparatus (C) as follows in a process which is separate from the process for manufacturing the seat cushion. First, the seat back pad 12 is applied to the seat back frame 11 and the seat back frame 11 and seat back pad 12 are covered with the seat back trim 13. Then, the end portion of the seat back trim 13 is wound around the seat back frame 11. Thereafter, the end portion of the seat back trim 13 is fastened to the seat back frame 11. Some kinds of seat cushion assembling apparatus may be utilized to mount parts on the seat back 10 rather than utilizing the seat back assembling apparatus (C).

Figure 13A:
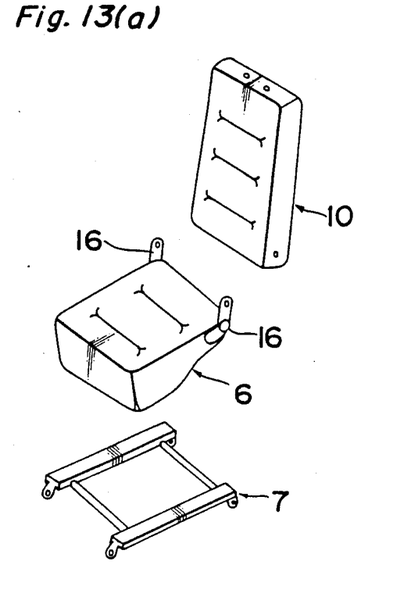
FIG. 13(a) is an exploded perspective view showing a seat.
Figure 13B:
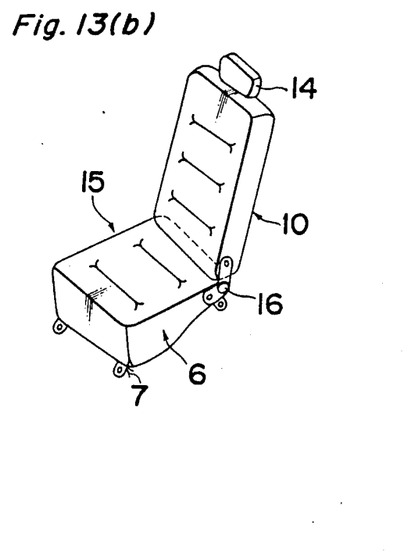
FIG. 13(b) is a perspective view showing the seat.

A seat 15 as shown in FIG. 13(b) is manufactured by using the seat assembling apparatus. As shown in FIG. 13(a), the seat cushion 6 is mounted on the seat slider 7, then the reclining brackets 16 of the seat cushion 6 are mounted on the seat back 10. Thereafter, a head rest 14 is attached to the seat back 10.

Figure 2:
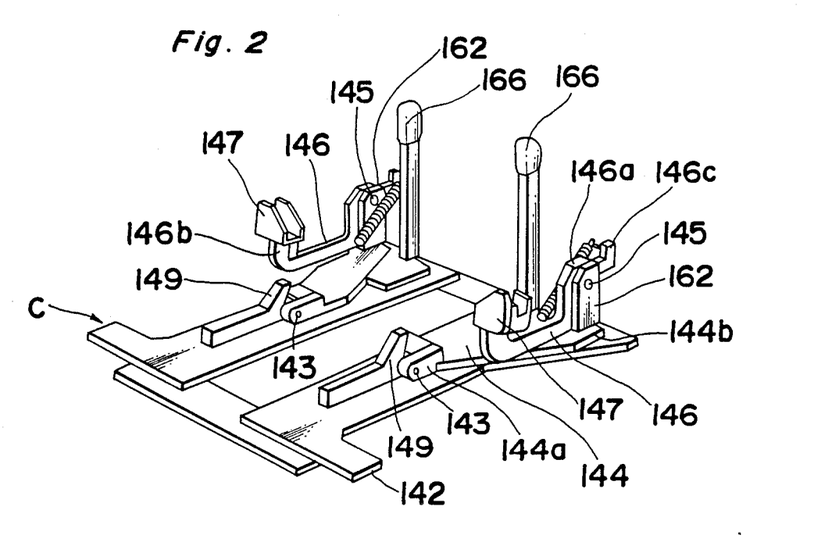
FIG. 2 is a perspective view showing the apparatus.

Referring to FIGS. 1 and 2, the seat back assembling apparatus (C) is mounted on a rotary pole 141 which is secured to a base 140 installed on a floor 1. The seat back assembling apparatus comprises a rotary table which is 142 horizontally rotatable; a first supporting arm 144 whose front end portion 144a is longitudinally pivotally mounted on the rotary table 142 by a first hinge axis 143; a second supporting arm 146 whose rear end portion 146a is longitudinally pivotally mounted on the rear end portion 144b of the first supporting arm 144 by a second hinge axis 145; a setting base 147 which is mounted on the front end portion 146b of the second supporting arm 146 and in which the lower corner 11a of the seat back frame 11 (refer to FIG. 12(a)) is placed in a position (I) in which the seat back frame 11 is approximately perpendicular to the rotary table 142; a rotation locking mechanism 148 for locking the rotary table 142 at a predetermined rotational position thereof; a first stopper 149 which contacts with the first supporting arm 144 so as to lock the first supporting arm 144 in a forward position (II) (refer to FIGS. 1 and 4) in which the first supporting arm 144 forms an angle of approximately 45° with the rotary table 142; and a second stopper 150 refer to FIG. 8) which contacts with the second supporting arm 146 so as to lock the second supporting arm 146 in a backward position (III) (refer to FIGS. 1 and 5) in which the second supporting arm 146 makes an angle of approximately 90° with the rotary table 142.

Figure 6:
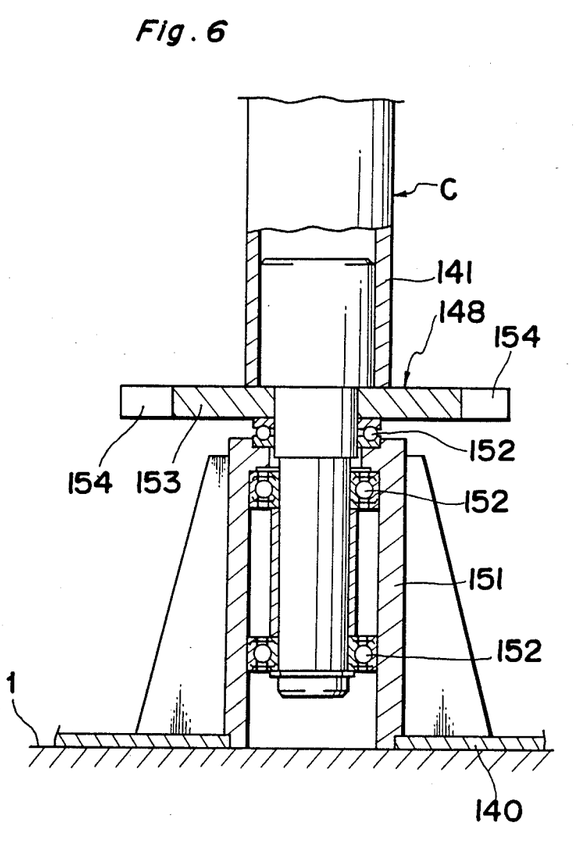
FIG. 6 is a sectional view showing the rotational mechanism of a rotary table.

Referring to FIG. 6, a bearing sleeve 151 is secured to the base 140 mounted on the floor 1. The lower portion of the rotary pole 141 is rotatably supported by the bearing 152 of the bearing sleeve 151.

Referring to FIG. 1, the bottom surface of the rotary table 142 comprising rectangular frames is secured to the top surface of the rotary pole 141. Accordingly, the rotation of the rotary pole 141 causes the rotary table 142 to rotate horizontally, i.e., the rotary table 142 is mounted on to and in parallel with the top surface of the rotary pole 141.

Figure 7:
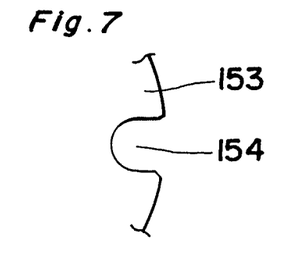
FIG. 7 is a plan view showing a principal portion of a locking disk.

Referring to FIGS. 6 and 7, the construction of the rotation locking mechanism 148 for locking the rotary table 142 is described hereinbelow. Concave portions 154 are formed at intervals of 90° with respect to the center of a locking disk, i.e., four concave portions are formed on the peripheral face of the locking disk 153 fixed to a lower portion of the rotary pole 141. As shown in FIG. 1, a foot pedal 156 is pivotally mounted by a hinge pin 157 on a bracket 155 fixed to the peripheral face of the bearing sleeve 151. A roller 158 capable of fitting into the concave portion 154 is mounted on the foot pedal 156. A coil spring 159 mounted between the foot pedal 156 and the bearing sleeve 151 urges the roller 158 to fit into the concave portion 154 through the foot pedal 156.

Accordingly, the rotary table 142 stops rotating every time it rotates 90°, i.e., the rotary table 142 stops rotating when the roller 158 fits into any one of the concave portions 154.

When the foot pedal 156 is pressed downward, the roller 158 disengages from the concave portion 154. As a result, the rotary table 142 resumes its rotation.

As shown in FIGS. 1, 2, 3, 4, 5, 8, and 9, each of the front portions 144a of the first supporting arms 144 is pivotally mounted on the rotary table 142 at an approximately middle portion in the longitudinal direction thereof by the first hinge axis 143 fixed to the first stopper 149.

Figure 8:
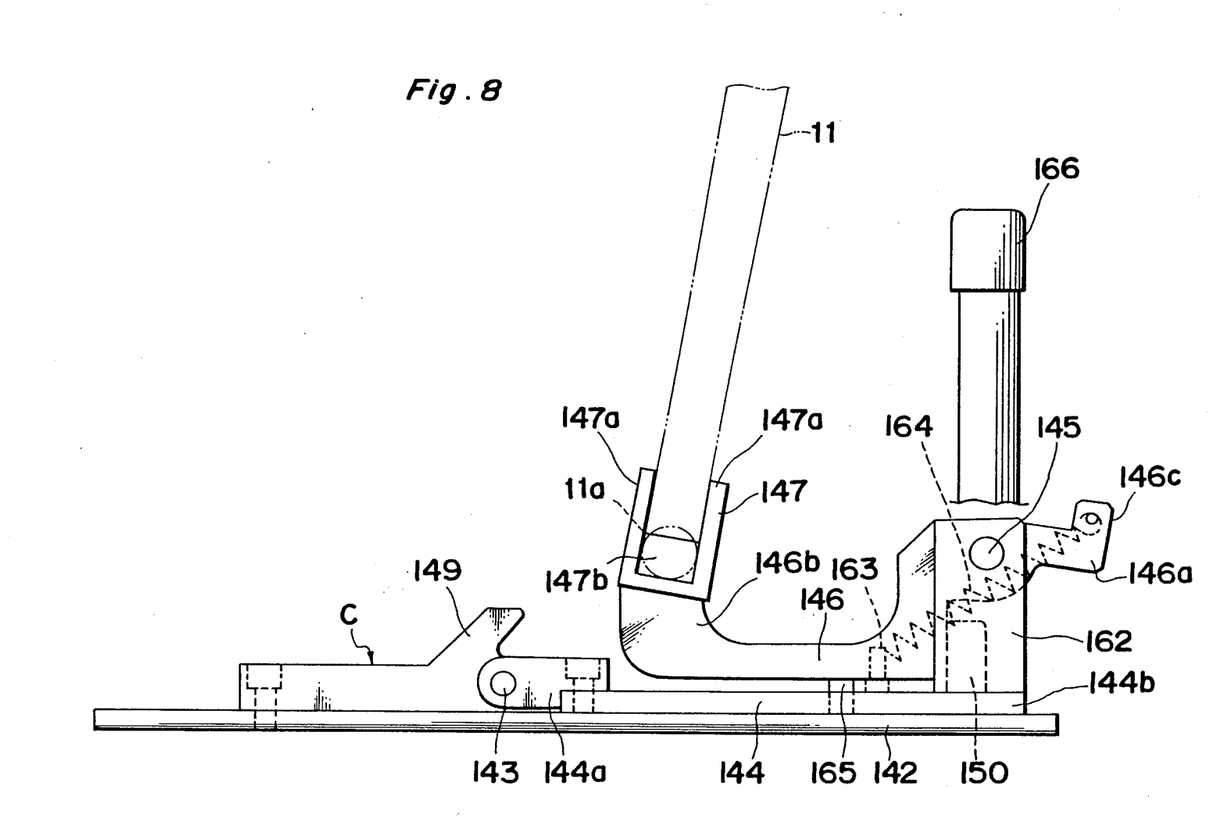
FIG. 8 is a side elevational view showing the rotary table.
Figure 9:
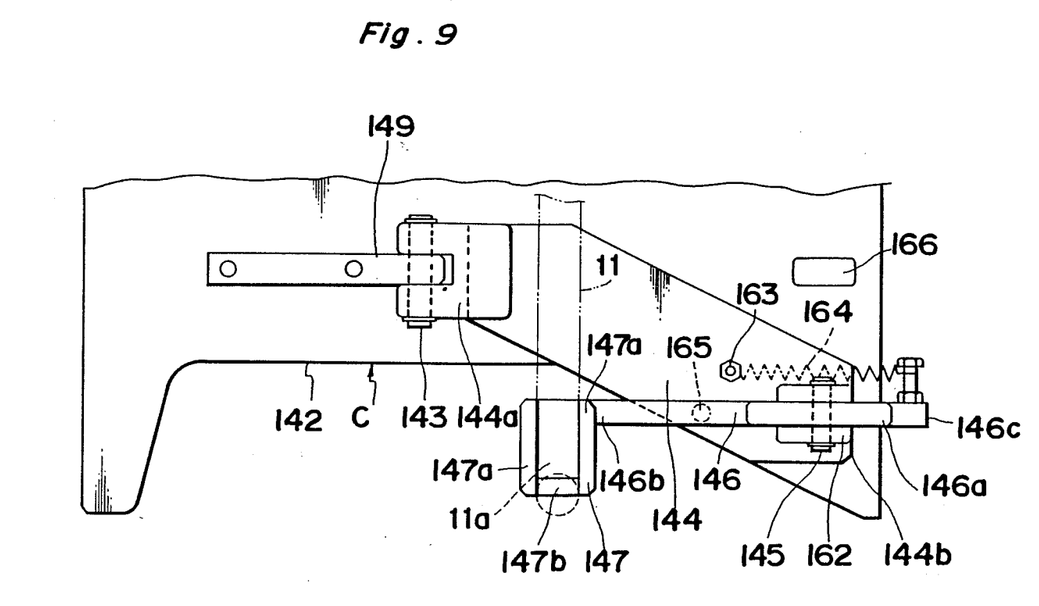
FIG. 9 is a plan view showing the principal portions shown in FIG. 8.

A bracket 162 is fixed to the rear portion 144b of the first supporting arm 144. The rear portion 146a of the approximately U-shaped second supporting arm 146 is mounted on the bracket 162 so that the second supporting arm 146 is pivotal about the second hinge axis 145.

A coil spring 164 is mounted between the rear portion 146c of the second supporting arm 146 and a pin 163 projecting from the first supporting arm 144. The coil spring 164 urges the second supporting arm 146 toward the forward position (II) in which the second supporting arm 146 is parallel with the first supporting arm 144 and toward the backward position (III) in which the second supporting arm 146 makes an angle of approximately 90° with the first supporting arm 144.

Figure 4:
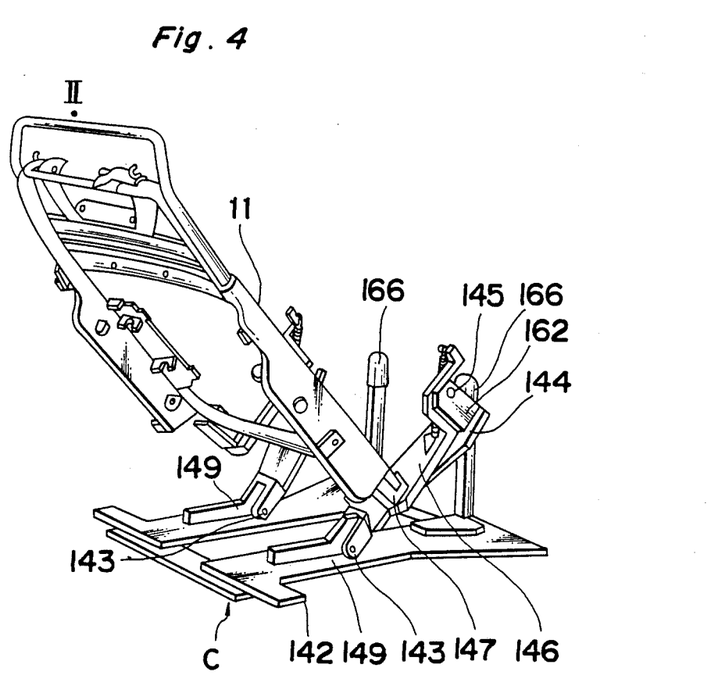
FIG. 4 is a perspective view showing the apparatus supporting the seat back frame tilted forward.

Referring to FIGS. 8 and 9, a stopper 165 projecting from the first supporting arm 144 abuts the second supporting arm 146 in the forward position (II) (refer to FIGS. 1 and 4). Referring to FIG. 8, a second stopper 150 mounted on the bracket 162 projecting from the first supporting arm 144 abuts the second supporting arm 146 in the backward position (III).

An approximately U-shaped setting base 147 is mounted on the front portion 146b of the second supporting arm 146.

Figure 3:
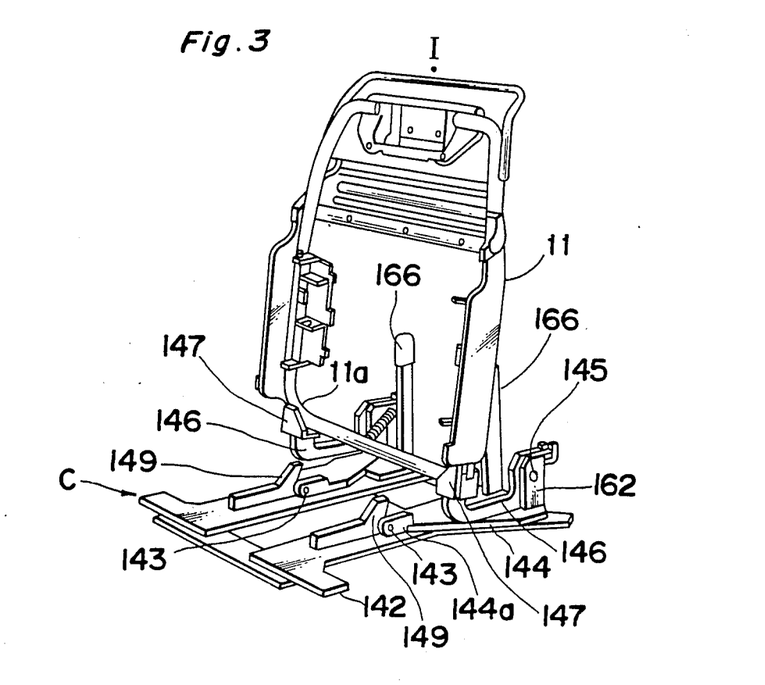
FIG. 3 is a perspective view showing the apparatus supporting a seat back frame perpendicularly.

Referring to FIGS. 3, 8, and 9, walls 147a, 147a prevent the seat back frame 11 with its lower portion 11a inserted downward into the setting base 147 from falling forward or backward and a wall 147b prevents the seat back frame 11 from shaking widthwise. Accordingly, as shown in FIG. 3, the seat back frame 11 can be placed in the second supporting arm 146 in position, i.e., the seat back frame 11 is supported by the second supporting arm 146 substantially perpendicularly to the rotary table 142.

Figure 5:
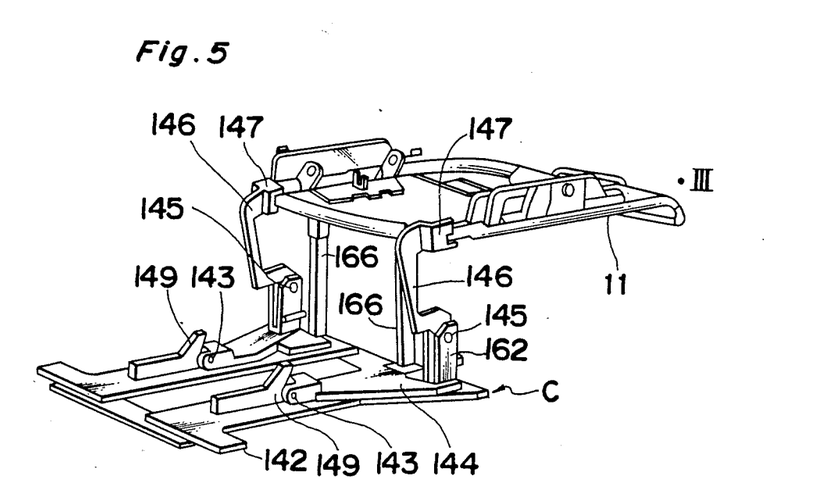
FIG. 5 is a perspective view showing the apparatus supporting the seat back frame tilted backward.

Referring to FIGS. 1 and 5, stopper poles 166 mounted on the rotary table 142 at the rear portion thereof contacts with the lower frame of the seat back frame 11 placed in the setting base 147 of the second supporting arm 146 when the seat back frame 11 is pivoted toward the backward position (III), thereby preventing the seat back frame 11 from falling from the setting base 147.

In the seat back assembling apparatus (C) having the above-described construction, as shown in FIG. 3, first, the seat back frame 11 is inserted from the lower corners 11a, 11a thereof into the setting bases 147, 147 of the second supporting arms 146, 146 so that the seat back frame 11 is approximately perpendicular to the rotary table 142.

Thereafter, the seat back frame 11 is covered with the seat back trim 13 with the seat back pad 12 applied to the seat back frame 11 while the rotary table 142 is being rotated.

Referring to FIG. 4, the seat back frame 11 is pressed forward. As a result, the first supporting arm 144 pivots toward the forward position (II) together with the second supporting arm 146. Thereafter, the first stopper 149 contacts with the first supporting arm 144, with the result that the first supporting arm 144 is locked thereby in the forward position (II) in which the seat back frame 11 forms an angle of approximately 45° with the rotary table 142.

In this condition, the back surface of the seat back trim 13 is fastened to the seat back frame 11 with clips.

Referring to FIG. 5, the first supporting arm 144 is pivoted backward, then the seat back frame 11 is pressed backward. As a result, the second supporting arm 146 is pivoted backward. Thereafter, the second supporting arm 146 is brought in contact with the second stopper 150, with the result that the second supporting arm 146 is pivoted to the backward position (III). Thus, the seat back frame 11 makes an angle of approximately 90° with the vertical position (I). In this condition, the stopper pole 166 prevents the seat back frame 11 from falling from the setting base 147.

In this condition, the end portion of the seat back trim 13 is wound around the seat back frame 11 and the seat back trim 13 is fastened to the seat back frame 11 with clips. Thus, the seat back 10 is manufactured.

Although the present invention has been fully described in connection with the preferred embodiments thereof with reference to the accompanying drawings, it is to be noted that various changes and modifications are apparent to those skilled in the art. Such changes and modification are to be understood as included within the scope of the present invention as defined by the appended claims.

What is claimed is:

1. An apparatus for assembling a seat for use in an automobile comprising:
    a table rotatably mounted on a base for rotation in a horizontal plane;
    A first supporting arm whose front end portion is pivotally mounted on said table about a horizontal axis of a first hinge for movement between a forward position, in which said first supporting arm forms an angle of about 45° with said table, and at least one other position;
    a second supporting arm whose rear end portion is pivotally mounted on the rear end portion of said first supporting arm about a horizontal axis of a second hinge for movement between a rearward position, in which said second supporting arm forms an angle of about 90° with said table, and at least one other position;
    a setting base which is mounted on the front end portion of said second supporting arm and on which the lower corner of a seat back frame is adapted to be placed in a position in which the seat back frame is approximately perpendicular to said table;
    a rotation locking mechanism for locking said table at a predetermined rotational position thereof;
    a first stopper for contacting said first supporting arm when the first supporting arm is in said forward position so as to lock the first supporting arm in said forward position; and
    a second stopper for contacting said second supporting arm when the second supporting arm is in said backward position so as to lock the second supporting arm in said backward position.

2. The apparatus as defined in claim 1, wherein the setting base comprises means for stabilizing the seat back frame when the seat back frame is placed in position in the setting base disposed above the table so that the seat back frame is substantially perpendicular to the table.

3. The apparatus as defined in claim 1, wherein when the seat back frame is placed in said setting base and the first stopper is brought in contact with the first supporting arm so as to lock the first supporting arm in the forward position in which the first supporting arm forms an angle of approximately 45° with the table, the seat back frame can be tilted approximately 45° with respect to the table.

4. The apparatus as defined in claim 1, wherein when the seat back frame is placed in said setting base and the second stopper is brought in contact with the second supporting arm so as to lock the second supporting arm in the backward position in which the second supporting arm forms an angle of approximately 90° with the table, the seat back frame can be tilted approximately 90° with respect to the table.

* * * * *